United States Patent Office 3,606,701
Patented Sept. 21, 1971

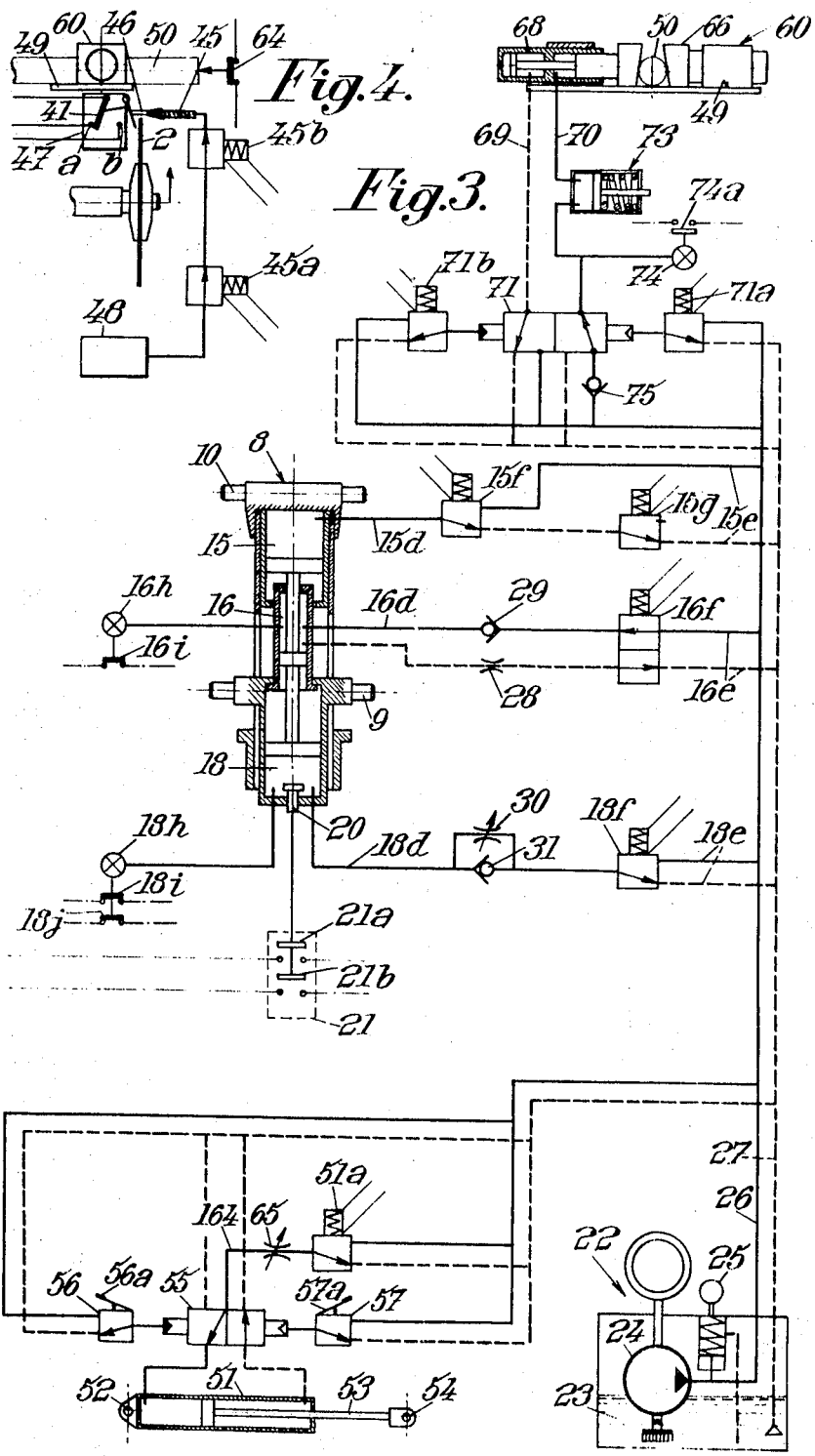

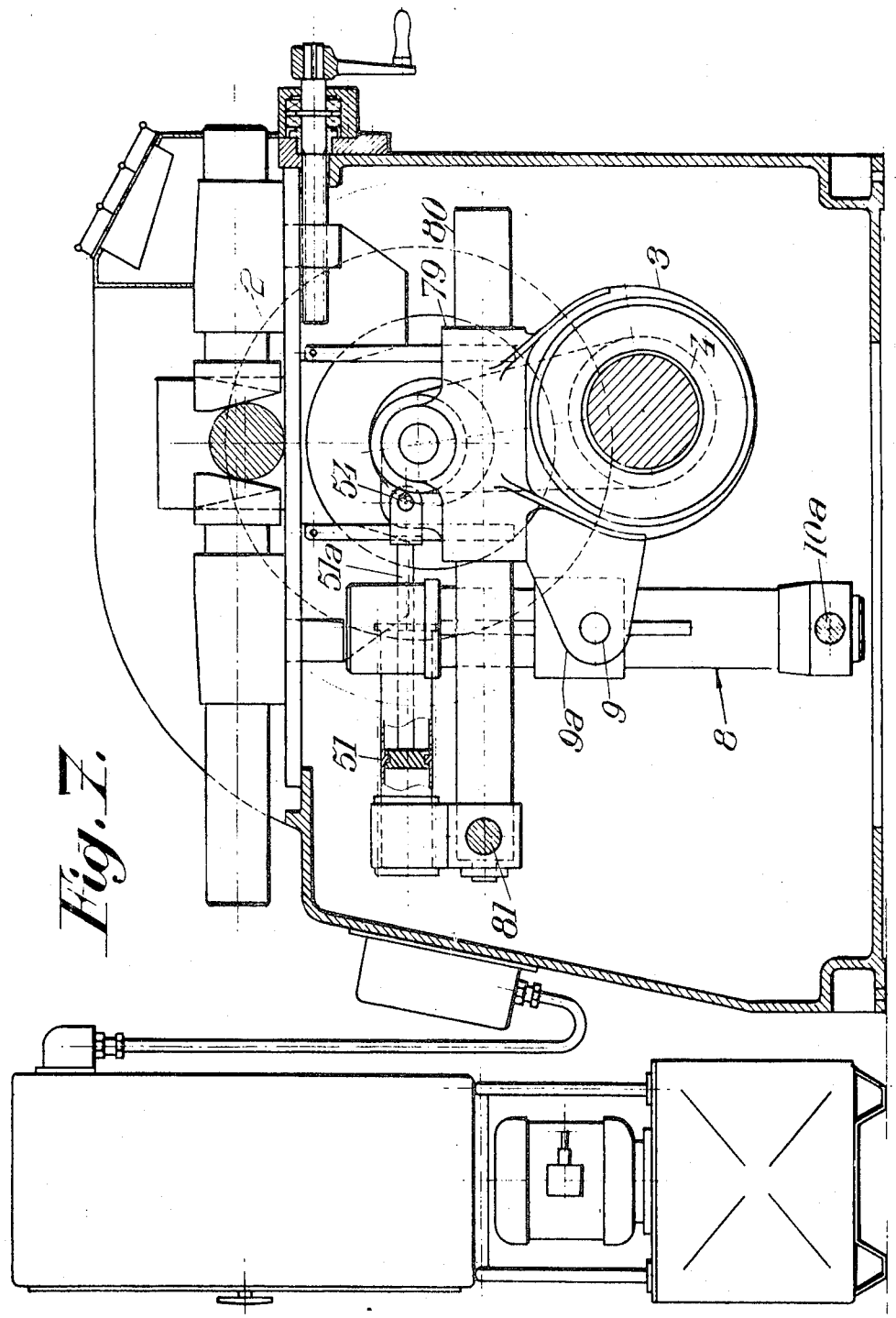

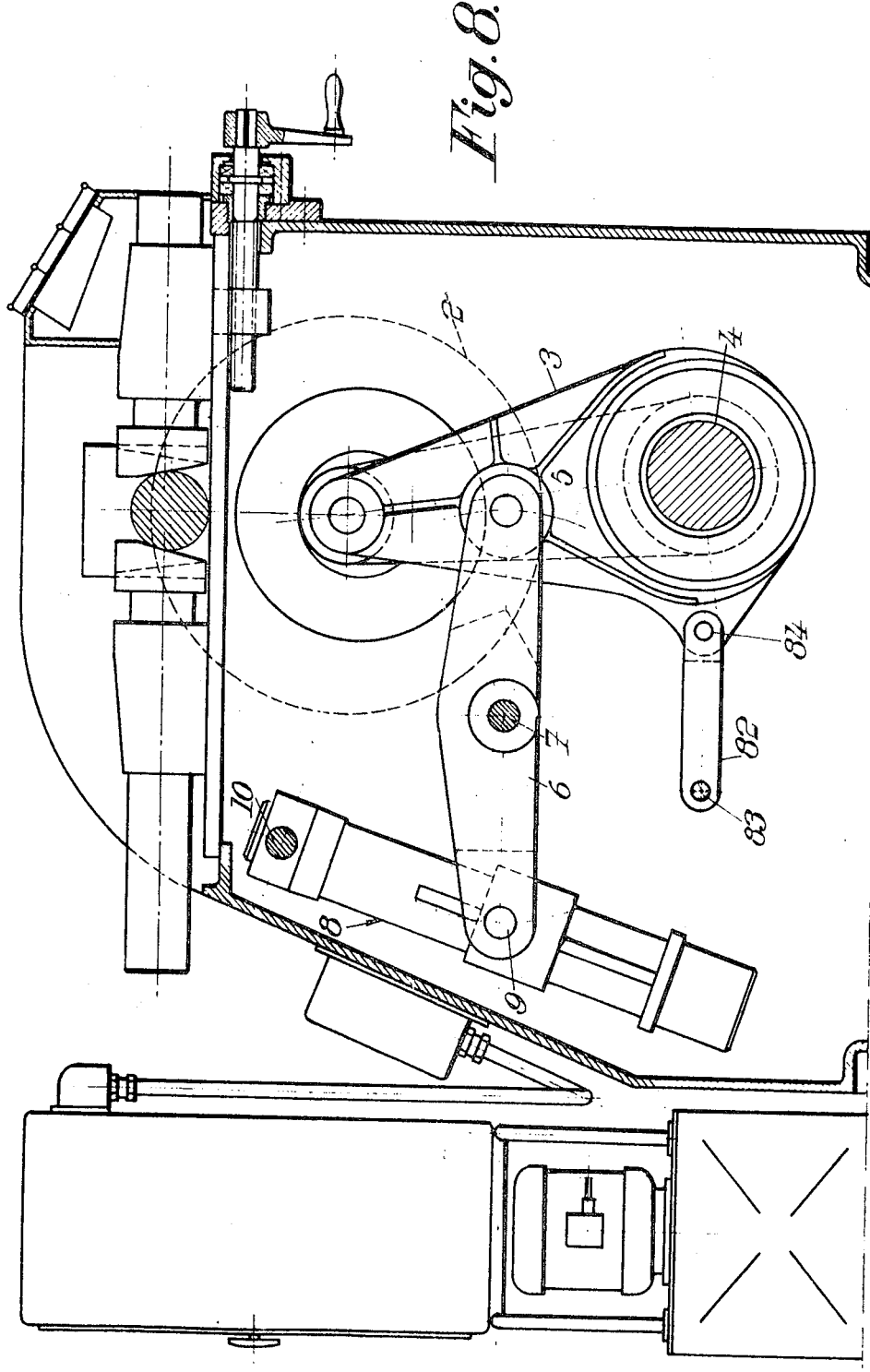

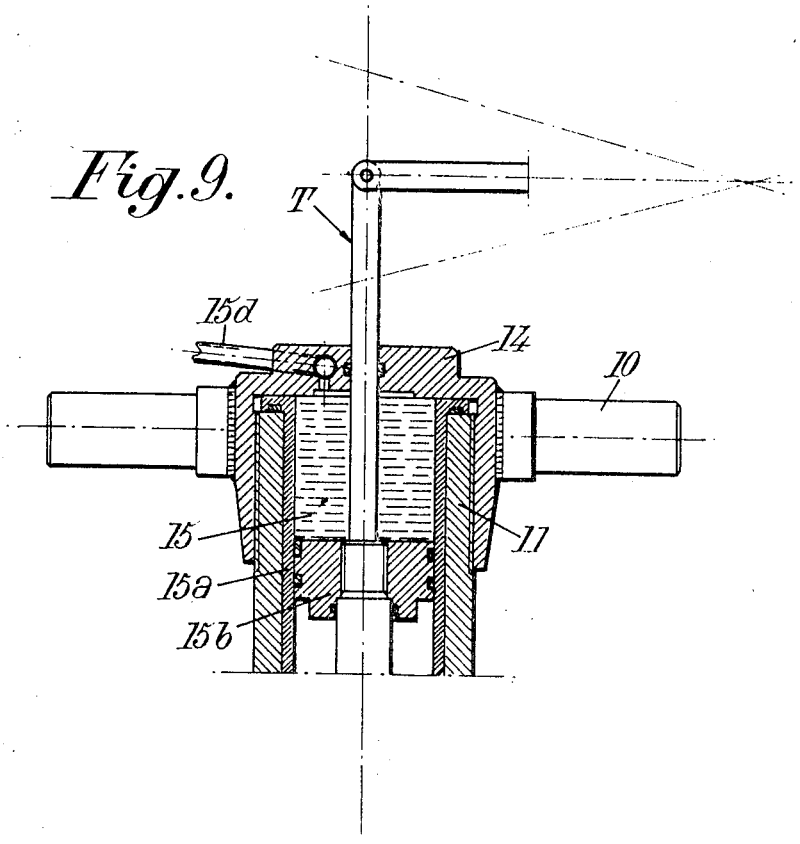

3,606,701
SECTIONING MACHINES COMPRISING MEANS CONTROLLING THE MOVEMENTS OF THE CUTTING TOOL
Jean Favot, 20 Rue Charles Martel, Nancy 54, France, and Rene Willaume, 163 bis, Rue de Vaugirard, Paris 75, France
Filed Mar. 11, 1969, Ser. No. 806,110
Claims priority, application France, Mar. 12, 1968, 143,413
Int. Cl. B24b 27/06
U.S. Cl. 51—98
15 Claims

ABSTRACT OF THE DISCLOSURE

The infeed of the cutting tool in a sectioning machine is controlled by a hydraulic unit constituted by (a) a "cutting" unit of which the two elements (piston, cylinder) are movable, but one of which is rigid with a mechanical member controlling the movements of the cutting tool,
(b) a depth of cut "regulating" unit of which the two elements are movable, one of these elements being movable through the intermediary of a one-way abutment by that of the elements of the "cutting" unit which is rigid with this member, and
(c) an "approach" unit, one element of which is movable and rigidly connected to the two movable elements of the other units, other than those which may make a one-way abutment and of which the other element is connected to the frame of the machine.

---

This invention relates to sectioning machines, that is to say machines for cutting work into predetermined lengths, comprising a rotary cutting tool, for example, a grinding wheel, a rotary saw, disc or the like, and means for controlling the approach, cutting and return strokes of the tool. In particular the invention is concerned, but not exclusively, with machines of this character in which the control means are able to govern the movements of the tool, when this tool is subject to a balancing movement, outside of its rotation for cutting, adapted to augment the capacities of the machine.

The object of the invention is to improve the efficiency of machines of this character, and to provide for automatic functioning thereof with a minimum of working adjustments. In particular it is aimed at eliminating adjustments of this kind related to the dimensions of the tool, of the work or bar to be cut, and to the wear on the tool.

The invention resides in the use in a sectioning machine which comprises a fixed frame and work support, a circular cutting tool, movable relatively to the work support, means including a mechanical member for moving said tool, and means controlling the approach stroke, the cutting stroke and the withdrawal stroke of the cutting tool relatively to the work, of the improvement wherein the control means comprises a hydraulic unit including (a) a first piston/cylinder unit, which operates as a jack and will be so hereinafter described (which controls the cut by said tool) the piston and cylinder of said unit both being movable relatively to said frame, and one of them being rigidly connected to said mechanical member;
(b) a second piston/cylinder unit for regulating the depth of cut into the work, the piston and cylinder of said second unit likewise being movable relatively to said frame and one of them being operable, by the element of said first piston/cylinder unit which is rigidly connected to the mechanical member, and through a unilateral abutment, in response to the cutting stroke of the tool into the work; and
(c) a third piston/cylinder unit for controlling the approach of the tool, one element (piston or cylinder) of said third unit being movable and rigidly connected to the movable elements of said first and second units, other than the said element adapted to make a unilateral abutment and that which is connected to said frame;

and said control means further comprising hydraulic and electrical means to control said hydraulic unit, said hydraulic and electrical means being adapted to operate said third piston/cylinder unit to bring said tool to a predetermined distance from the work, then to operate said first and second piston/cylinder units and move the tool in with a cutting stroke, and finally to operate at least one of said three units for retraction of the tool.

An advantageous further feature of the invention lies in the inclusion in the machine of means for setting the working edge of the tool, for example the periphery or circumference of the grinding wheel, relatively to the work, setting means comprising an emitting member and a receiving member responsive to a transmission medium (which may be a light beam, a water jet, compressed air jet, and so on) emitted from said emitting member and capable of being intercepted by said tool, and the arrangement in which said setting means are in a fixed position relatively to the frame of the machine such that, when the approach stroke of the tool has brought the outline of the same to a predetermined distance from the work, this outline intercepts the transmission medium from the emitting member and the receiving member responds to apply a control to said hydraulic and electrical means and arrest the approach stroke of the tool.

In accordance with another advantageous feature of the invention the machine further includes motor means for applying a balancing movement to the said cutting tool, and the said hydraulic and electrical means are adapted to operate said motor means only after the approach stroke of the tool has been arrested by the control response from said receiving member and the transmission medium has ceased.

By a further feature of the invention the sectioning machine, more particularly where devised for cutting work of bar form, further includes hydraulic means for clamping a bar on said work support and has means for sensing a predetermined axial positioning of the bar relatively to the tool, the arrangement being that said hydraulic and electrical means are arranged to cooperate with said hydraulic clamping means and with said sensing means so as to prohibit a cutting stroke by said tool into the bar unless the latter is in said predetermined axial position and is clamped by said hydraulic clamping means, and to maintain the clamping of the bar by said clamping means when the sectioning machine is stopped.

In accordance with another feature of the invention, a driving motor is provided for rotating the cutting tool and means are used to regulate the rotation of this motor; in this case the said regulating means are controlled by a member responsive to part at least of the relative displacement between the piston and cylinder elements of said third piston/cylinder unit, whereby the rate of rotation of said tool increases in the same sense as the magnitude of this relative displacement.

The invention will now be described by way of illustration with reference to the accompanying drawings which illustrate certain embodiments thereof and wherein like characters denote corresponding parts in the various views. In these drawings:

FIG. 3 is a diagram of the hydraulic circuit of the control device;

FIG. 4 is a diagram which illustrates the means for setting the tool in relation to the bar to be sectioned;

FIG. 7 is a general view of a sectioning machine equipped with a control device in accordance with a variant of that shown in FIG. 1; and FIG. 8 is a sectioning machine in accordance with the invention, but one in which the tool does not have a pivoting movement; and FIG. 9 is a partial longitudinal section of a variation of the hydraulic control unit.

Figure 1:
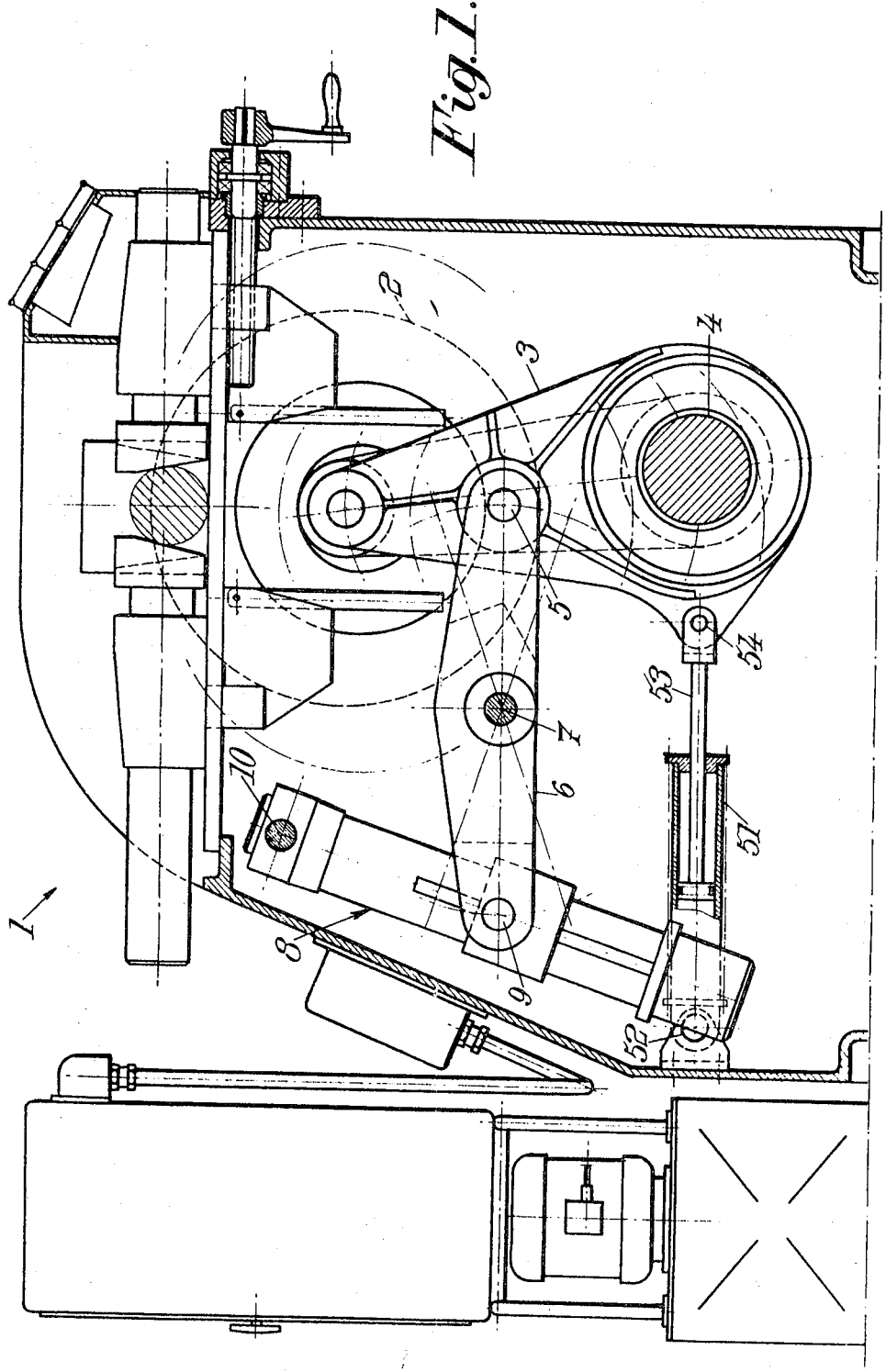
FIG. 1 is a general view of a sectioning machine according to the invention with its control device.

In the preferred embodiment of the invention illustrated in FIG. 1 the sectioning machine is generally designated 1, and this has a tool 2, in this instance a grinding wheel, mounted on an arm 3 which also carries a driving motor 4 for the wheel. This arm 3 is pivotally connected at 5 to a second arm 6 which is pivotally supported on the frame of the machine at 7. This sectioning machine is, in accordance with the invention to be provided with a control device which is adapted to provide for automatic functioning and to dispense with the majority of the regulating factors normally required.

The approach plunge and retraction movements of the grinding wheel 2 are produced with the assistance of a hydraulic unit 8 which controls the pivoting of the other end 9 of the arm 6. This unit 8 is mounted for rocking at 10 on the frame of the sectioning machine such that, as will be hereinafter described, the axis of the wheel 2 is adapted to move in a practically rectilinear direction.

Figure 2:
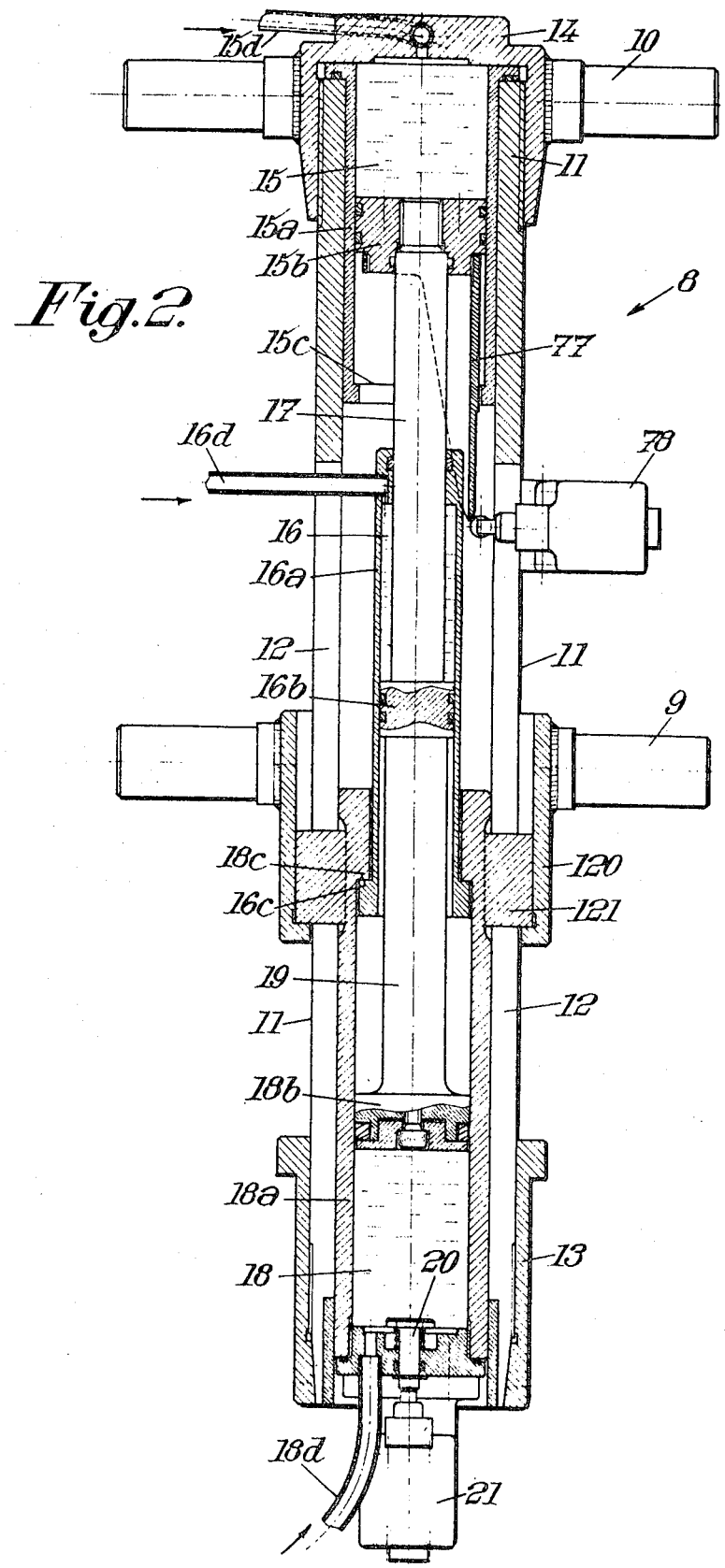
FIG. 2 is a longitudinal section of the hydraulic unit of the said control device.

As illustrated in FIG. 2, the hydraulic unit 8 comprises an external cylindrical casing 11 having two diametrically opposite slots 12 which open at one end of the casing 11. The casing is provided at its two ends with caps 13, 14, the second of these carrying the pin 10 on which the unit 8 rocks. Mounted within the casing is an approach screw 15 having a sleeve 15a, which is fixed relatively to casing 11, and a piston 15b. Sleeve 15a has an abutment 15c which limits the stroke of piston 15b.

Also mounted in casing 11 is a jack 16 which regulates the depth of cut of the tool, this jack 16 having a sleeve 16a and a piston 16b both of which are movable axially in casing 11. Piston 16b is rigidly connected to the piston 15b of jack 15 by a rod 17.

A cutting jack 18 is also installed in casing 11, this jack 18 having a sleeve 18a and piston 18b, these two likewise being movable within the casing 11, the piston 18b being rigidly connected to piston 16b of jack 16 by a rod 19, and the sleeve 18a having a re-entrant part 18c adapted to make a unilateral abutment with a projecting part 16c of sleeve 16a.

The pin 9 is driven with the assistance of a piece 120 which is made rigid with sleeve 18a through the agency of at least one slide 121 movable in the slots 12.

The mobile elements of the jacks 16, 18 and the rods 17, 19 are guided as follows:

Sleeve 18a has an external diameter corresponding to the internal diameter of the casing 11, the assembly of pistons 15b, 16b, 18b and of rods 17, 19 is guided by the sleeves 15a, 18a and sleeve 16a is guided by the pins 17 and 19 and piston 16b.

The three jacks are single-acting and are supplied with liquid (usually oil) under pressure respectively through conduits 15d, 16d, and 18d such that the jacks 15 and 16 act downwardly on their pistons and the jack 18 acts upwardly on its piston.

At its lower part sleeve 18a includes a push button 20 which is co-axial with the sleeve and is mounted resiliently in position. In addition the sleeve 18a supports a switch 21 which is closed by the press button 20 under the action of piston 18b, when the jack 18 is purged.

Reference will now be made to FIG. 3 to describe the hydraulic circuit controlling unit 8. The installation comprises a hydraulic group 22 comprising a liquid supply 23, a pump 24 and a pressure regulator 25. The liquid is distributed under pressure through a conduit 26 and the purged liquid is returned through a conduit 27 to the supply 23. Three pairs of conduits 15e, 16e, 18e branched from conduits 26, 27 are used to operate the hydraulic unit. A jack 15 is pressurised through conduit 15e, a three-way solenoid valve 15f, and conduit 15d; its exhaust through conduit 15d, the solenoid valve 15f and the second conduit 15e in which is interpolated a two-way solenoid valve 15g. A valve 15f is disposed and arranged to provide communication between the conduit 15d and exhaust conduit 15e when it is de-energised; solenoid valve 15g is devised so as to allow the exhaust liquid to pass when it is at rest, and to block any circulation of exhaust liquid when it is energised. Disposed in conduits 16e is a four-way solenoid valve 16f which is adapted to allow the liquid to pass through jack 16 when it is energised, but to trap this liquid in the jack when it is de-energised. A slow-relief diaphragm valve 28 is included in the exhaust conduit 16e and a non-return valve 29 is disposed in conduit 16d. A manometer 16h controls the pressure in jack 16 and opens contact 16i in the event that the pressure exceeds a predetermined figure.

Conduits 18e provide the two inlets of a three-way solenoid valve 18f, the outlet from which is represented by conduit 18d. The solenoid valve 18f connects the conduit 18d to exhaust when it is de-energised. Arranged in conduit 18d is a valve 30 with an output which can be regulated as required, in parallel with the selector valve of the rapid exhaust circuit 31. In like manner to the arrangement previously described, a manometer 18h controls the pressure in jack 18 and opens two contacts 18i, 18j should an excess pressure occur.

Figure 5:
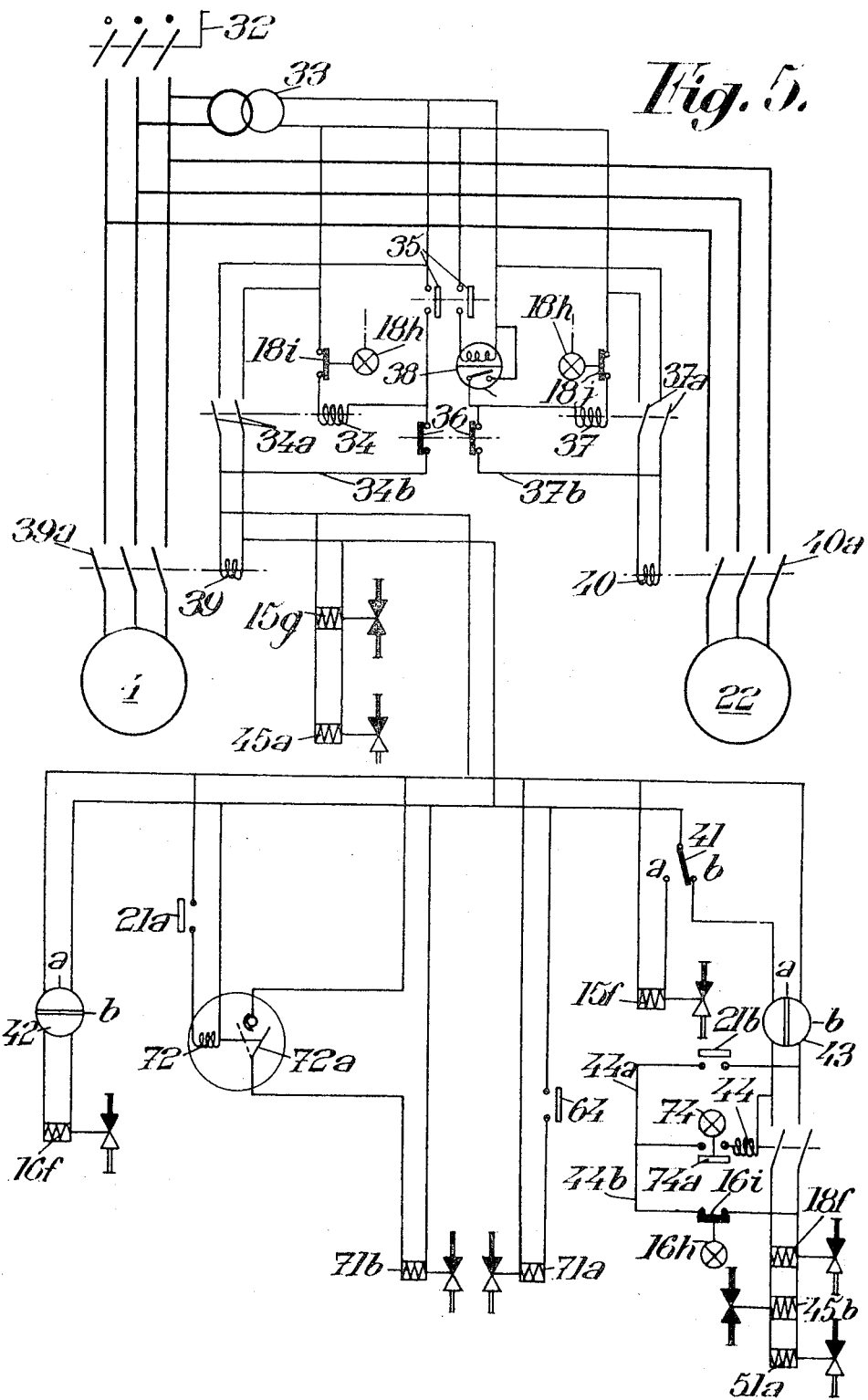
FIG. 5 is a diagram of the electrical circuit of the control device.

The electrical circuit of the device according to the invention is illustrated in FIG. 5. A main switch 32 allows for the preparation of the energising of the motor 4, the group 22 and the electrical installation of the control proper after transformation at 33. A first relay 34 is branched from a terminal at the output of the transformer 33, through a contact 18i and, from the other terminal, through a manual press switch 35 which is normally open. This relay controls two coupled contacts 34a and has an auto-feed branch 34b which includes a manual press switch 36 which is normally enclosed. A second relay 37 is branched from an output terminal of the transformer 33 through contact 18j and from the other terminal through a time switch 38 which is set off by the closure of switches 32 and 35. This relay controls two coupled contacts 37a and has an auto-feed branch 37b including a further press switch 36 which is coupled with that previously mentioned and which is normally closed.

Contacts 34a and 37a are respectively used to energise and de-energise the two other relays 39 and 40 which in turn control the energisation and de-energisation respectively of motor 4 and of group 22 through contacts 39a and 40a.

Connected in parallel to the winding of relay 39 are the following:

The solenoid valve 15g which is used to exhaust jack 15,

The solenoid valve 15f controlling the pressurising of jack 15, this valve being controlled by a switch 41 the solenoid-valve-energising position a of which is obtained when the circumference of grinding wheel 2 is at a predetermined distance from the member to be cut, The solenoid valve of 16f which controls the jack 16 and is energised when a manual switch 42 is in its position a, and is at rest when this switch is at position b, The solenoid valve 18f which is only energised at the same time as the valve 15g if, at this time, the switch 41 is in position b (when the circumference of the wheel 2 is at a distance less than or equal to the predetermined distance referred to above), the safety manual switch 43 is at position a and a relay 44 is energised, this relay comprising a control line 44a which includes a contact 21b of the switch 21, and an auto-feed branch 44b in which is disposed contact 16i and which is connected to a terminal of solenoid valve 18f.

The operation of the sectioning machine 1, equipped with the control device described above will now be explained with reference to FIGS. 1, 2, 3 and 5.

A bar to be cut into sections is clamped in a vice (which will hereinafter be described), and the sectioning machine, being equipped with its grinding wheel 2, is assumed to be at the rest position thereof in which the electrical supply is cut off (switch 32 open), the jacks 15 and 18 are exhausted (under the action of the counterweight represented by the balance arm 3), contacts 18i, 18j, 21b are closed, switch 41 is at position a, and the solenoid valves are de-energised.

The main switch is closed, the effect of which is to energise transformer 33, and the manual switch button 35 is pressed. Relay 34 is immediately energised and closes contacts 34a so producing rotation of motor 4 (through relay 39) and the excitation of solenoid valve 15g which thenceforth interrupts any exhaust of jack 15. After a certain time delay, due to the timing device 38, the relay 37 is duly energised and closes contacts 37a, which energised relay 40 controlling the hydraulic group 22. When the press button 35 is released, relay 34 remains energised through its connection 34b and the operation of the timing device is not interfered with because the electrical impulse which it receives when the button 35 is pressed is sufficient to release it.

Group 22 now being activated, liquid is pressurized in conduit 26 (FIG. 3). The grinding wheel still being remote from the bar to be cut, the switch 41 is in position a, and the solenoid valve 15f is energised at the same time as solenoid valve 15g, this latter having no effect when the solenoid valve 15f is energised (see FIG. 3). Liquid is admitted under pressure into jack 15, and the piston 15b of the latter is pushed downwards. This, through rods 17 and 19, drives the piston 18b which, in turn, moves sleeve 18a and thus grinding wheel 2, against the action of the counterweight. This approach movement continues so long as the solenoid valve 15f remains energised, that is to say so long as the switch 41 is in position a. When the grinding wheel is sufficiently close to the bar, switch 41 moves into position b. This switching over movement can be performed manually but is preferably automatic, in accordance with this invention, as will later be apparent. The solenoid valve 15f is de-energised (and thus corresponds to "exhaust") but, valve 15g remaining energised, the liquid initially admitted to jack 15 is trapped and from that time constitutes a fixed liquid stop. As soon as switch 42 is moved manually to position a, which movement may be carried out at any moment after the commencement of operations, the solenoid valve 16f allows liquid to pass under pressure into jack 16, whilst the exhaust conduit 16e is likewise opened. Jack 16 is charged by virtue of the admission-exhaust difference in delivery brought about by the diaphragm valve 28. Sleeve 16a of jack 16 rises in relation to its piston 16b.

When the switch 41 rocks into position b, and if the switch 43 is in position a, the relay is energised through its control line 44a (contact 21b being closed because jack 18 is empty) and energises the solenoid valve 18f which allows pressurized liquid to flow into this jack. The bottom of sleeve 18a moves away from piston 18b and contact 21 opens; relay 44, however, remains energised through line 44b since contact 16c is closed.

Jack 18 is charged, its sleeve 18a descends against the action of the counterweight, whilst its piston 18b remains fixed because of the liquid stop provided in jack 15. The time then arrives in which the parts 16c, 16a and 18c of sleeves 16a and 18a abut one another. This engagement will take place before or after the charging of jack 18 depending on the moment at which the switch 42 is brought into position a. However, a jack 16 will be charged as soon as possible because the cutting of the bar will commence from the time that the jack 18 is charged.

Sleeves 16a and 18a are urged in opposite directions by their jacks and it is arranged that the action of jack 18 is opposed to the combined actions of the jack 16 and the counterweight. This may in fact be arrived at by making the effective surface of piston 18b of a size which is substantially greater than that of active surface of piston 16b (that is to say the difference between the surface area of piston 16b and the cross sectional area of rod 17), and principally by placing jack 16 under partial exhaust (under the effect of the diaphragm valve 28 and the non-return valve 29 in the admission conduit 16d). It is to be noted, moreover, that the small cross sectional area of jack 16 enables it to be filled practically instantaneously.

Thus the forward cutting movement of the grinding wheel into the bar is produced automatically at a rate defined by the delivery into jack 18 and primarily depending instead on the pressures in the jacks 16 and 18 and, to a lesser extent on the counterweight, the lever arm and the resistance to cutting. When the section has been completely cut, or if it is only required to disengage the grinding wheel, all that is required is to place switch 42 in position b; solenoid valve 16f then closes and traps the liquid in jack 16 so that this will thenceforth provide a fixed stop. Jack 18 remains at the working pressure controlled by solenoid valve 18f and continues to urge sleeve 16a downwards. Having regard to the small effective surface area of piston 16b in relation to that of piston 18b and excess pressure is produced in jack 16 (excess, that is, in relation to the useful pressure in this jack) and this releases manometer 16h to open contact 16i. This contact in turn opens the auto-feed branch 44b of relay 44, so that the latter is de-energised (its control line being open by contact 21b because jack 18 is no longer empty). Solenoid valve 18f is thus de-energised and this produces a rapid exhausting of jack 18 by virtue of the selector valve in circuit 31, which opens, and of the counterweight. The grinding wheel is disengaged from the bar and retracted until jack 18 is empty, piston 18b being held in place by jack 15 which continues to form an abutment.

If, on the other hand, the section cutting is allowed to continue without surveyance, sleeve 18 continues its stroke and so moves the wheel 2 and the sleeve 16a forwards until (see FIG. 2) the piece 120 abuts the lower cap 13 or, depending on the circumstances, until the jack 16 is completely emptied and its sleeve 16a thus brought into abutment against piston 16b. In both cases casing 18a is mechanically arrested and, since jack 18a continues to be charged with liquid, an excess pressure is created therein (the jack 16 remaining at its utility pressure) so operating the manometer 18h and opening contacts 18i, 18j, which de-energises relays 34, 37. The electrical feed is interrupted downstream of transformer 33 and all the solenoid valves are de-energised. Jacks 15 and 18 empty under the action of a counterweight and jack 16 remains in the position which it has arrived at. There may be failure to bring the switch 42 into position a at the beginning of the cutting. In this event the casing 16a of jack 16 constitutes a fixed abutment which the sleeve 18a will strike before or after the complete cutting through of the bar, depending on the amount of liquid trapped in jack 16. Failure to carry out this operation will thus, as described above, re-act as an interruption of the forward advance of the grinding wheel and in the disengagement thereof as soon as it has reached a position corresponding to the quantity of liquid in the jack 16.

The advancing of the grinding wheel may be arrested at any time, and this wheel retracted to its approach position (defined by jack 15), by throwing over the safety switch 43 into position b. This de-energises solenoid valve 18f and brings about complete exhaustion of jack 18. It is to be noted that this switch has no effect on the approach movement of the grinding wheel. Thus it is possible to prevent the cutting operations taking place whilst leaving the approach movement to be carried out. From the foregoing it will be understood that a predetermined quantity of liquid trapped in jack 16 will define the stroke of the grinding wheel starting from the end of its approach stroke. By leaving switch 42 in position b and irrespective of whatever regulations have been carried out, one is thus assured of producing the same plunger cutting movement starting from the position at the end of the approach stroke; thus jack 15 may be exhausted (for example when it is necessary to change a worn grinding wheel) without interfering with the jack 16.

It will be noted that the manometer 18h likewise has a double safety role.

If the grinding wheel is too small to cut through the bar, there is a maximum filling of jack 18 and the contacts 18i, 18j will be open to stop the machine. If the cutting bar stroke is excessive, the jack 18b will be over pressurised and the manometer 18h will arrest the machine, thus avoiding any risk of accident such as the breakage of the grinding wheel.

In the preceding description, reference is made to a switch 41 the position of which corresponds either to rapid approach of the grinding wheel (position a) or to the cut advance stroke (position b). As has been seen, since the stroke of the grinding wheel, starting from the end of its approach stroke, may be constant, it is advantageous if this end of the approach stroke position can be set once and for all. It is also of advantage if this position is not defined by the position of the axis of the grinding wheel, but by the distance of the circumference of the wheel from the bar which is to be cut.

In accordance with a feature of the invention means are provided for setting the position of the circumference of the grinding wheel with respect of the bar, these means being constituted by an emitting member and a receiving member which is sensitive to a beam or current (see below) transmitted by the emitting member, which can be interrupted by the grinding wheel when the circumference of the latter intercepts it. This beam or current can be of any nature, depending on the circumstances. Thus, for example, it may comprise a jet of compressed air emitted by a nozzle and actuating a contact in cutting the geometric plane of the grinding wheel; again use may be made of a photoelectric cell of which the light beam intersects the plane of the wheel as has been diagrammatically illustrated in FIG. 4, use will preferably be made of liquid means if the sectioning machine is provided with a device for wetting the grinding wheel and/or the bar. For this purpose use is made of a nozzle 45 adapted to emit a jet of water 46 which operates a microswitch diagrammatically illustrated at 47.

Whatever embodiment is used, the receiving member will be so related to the switch 41 (FIG. 5) that the latter is in position a when the beam or the like is not interrupted, but will assume position b when it is interrupted. In the case of a saw, parasitic signals (due to the irregular intersection of the beam due to the teeth) may be avoided either by stopping the beam when the first intersection takes place or by providing a delay device which allows the saw to advance until the teeth have passed through the beam.

In the embodiment chosen for illustration, the switch 41 is represented by a mechanical-action microswitch 47 as illustrated in FIG. 4. The nozzle 45 is supplied with water under pressure from a reservoir 48, through a solenoid valve 45 electrically connected to the terminals of the solenoid valve 15g (FIG. 5). Thus as soon as jack 15 is operated, the water jet 46 is produced and brings switch 41 into position a until the grinding wheel 42 interrupts it and causes the switch 41 to rock back to position b.

The provision of these means for setting the position of the grinding wheel under the control of its diameter has various advantages. In the first place the end of the rapid approach movement is not controlled by the operator (who, for safety reasons, would stop this movement at a greater distance from the bar than is absolutely necessary, this meaning loss of time, or would stop it too late, in which event the grinding wheel would engage the bar at too high a speed, risking an accident). Moreover, the position of the grinding wheel being determined by its external size, it will be appreciated that no regulation is necessary either as a function of the tool (diameter, wear, nature) nor as a function of the bar. It is only required to arrange these means so that the jet 46 is produced just below the table 49 on which the bar 50 to be cut is placed. Thus, where the same tool is used for a plurality of operations, the operator does not have to be concerned with the wear of this tool (machining wear, grinding, or diamond dressing).

Moreover these setting means act as a safety feature in the event that the operator omits to equip the sectioning machine with its cutting tool. In this event the approach stroke will be carried out normally, but, since nothing interrupts the beam 46, jack 15 will fill until its piston 15b comes to a stop at 15c, which will rest the approach stroke. The switch 41 will remain in position a and the flange cutting will not take place. Moreover it is possible, in an appropriate case, to provide the abutment 15c with a contact which will de-energise the installation if it is actuated at the end of stroke of jack 15.

As has been mentioned above, it is advantageous, in increasing the capacities of the sectioning machine, to cater for a balancing movement of the shaft of the grinding wheel so that this wheel remains in the same plane and the direction of penetration of the wheel into the work is substantially rectilinear, in relation to the mean position occupied by the wheel shaft.

To implement this, driving means are provided which are adapted to impart a balancing movement to the grinding wheel, these driving means including limit switches at the end of the stroke, each mounted on an element of the vice gripping the work 50 and adapted to reverse the direction of movement imparted to the arm 3, which carries the wheel 2, when this arm 3 acts on one or other of these switches. The switches may be of any suitable nature (mechanical, hydraulic, pneumatic or electric) depending on the way in which the oscillation is brought about.

In the embodiment illustrated in the drawings, this balancing action is brought about with the assistance of a double effect piston cylinder unit 51 (FIGS. 1 and 3) which is pivotally mounted at 52 on the frame of the sectioning machine, and the rod 53 of which is articulated to arm 3 at 54. This unit or jack 51 is controlled (FIG. 3) by a hydraulic distributor 55 having two outlets, one for each chamber of the jack, and responsive to two valves 56, 57 which represent the limit switches. These valves (FIG. 6) are mounted on brackets 58, 59 each rigidly fastened to one element of the vice 60; pivotally mounted to these brackets are also two regulating members 62, 63 which, when at rest, bear against the mechanical control elements 56a, 57a, of the valves. The regulating members 62, 63 are operated alternatively by the arm 3 at each end of the stroke and, each time they are biased, the valves occupy one of their two change over positions. The valves are connected to the hydraulic circuit 26, 27 (FIG. 3) and their outlets, each of which remotely controls the distributor 55 in one sense, may each be connected either to the pressurised conduit 26, when the corresponding regulating member is operated, or to the exhaust conduit 27 for the remainder of the time.

As regards the hydraulic distributor 55, its discharge outlets are connected to compression and to exhaustion, alternatively and in opposition. Disposed in the conduit 164 through which liquid is supplied under pressure is a diaphragm valve 65 which is adjustable as required to impart the required timing to the oscillation, and a solenoid valve 51a. The oscillation only being necessary when the cut actually commences, solenoid valve 51a is connected in parallel to terminals of the solenoid valve 18f which controls the cutting jack 18 (FIG. 5). Moreover the solenoid valve 51a caters for the connection of the two chambers of jack 51 to exhaust for which purpose, when the sectioning machine is not functioning, the arm 3 may be oscillated by hand. In the event that the grinding wheel 2 is given a balancing movement and/or use is made of the means for setting the position of the circumference of the wheel (FIG. 4), it is to be noted that, during the balancing operation, it may happen that the grinding wheel, particularly if it is of small diameter and/or if the amplitude of the balancing movement is large, leaves the range of action of these setting means. Consequently, if no special precautions are taken the transmitting medium or beam 46 will reach the receiving member in a discontinuous fashion, and the switch 41 will oscillate between positions a and b, which will bring about a rapid and discontinuous advance of the grinding wheel into the bar (by the jack 15 which is acted on when the switch 41 is in position a). It is for this reason that, as soon as the wheel has reached its approach position, and when the balancing effect has not yet started, that is to say as soon as the beam 46 is intercepted for the first time, this beam is interrupted. This may for example be brought about by providing (FIGS. 3 and 4) a second, two-way solenoid valve 45b which is in hydraulic series with the solenoid valve 45a and electrically in parallel with the solenoid valves 18f and 51a.

This solenoid valve 45b is arranged to interrupt all feed to the nozzle 45 when cutting commences, that is to say when it is energized at the same time as the solenoid valve 18f. The drawback outlined above is thus avoided.

Figure 6:
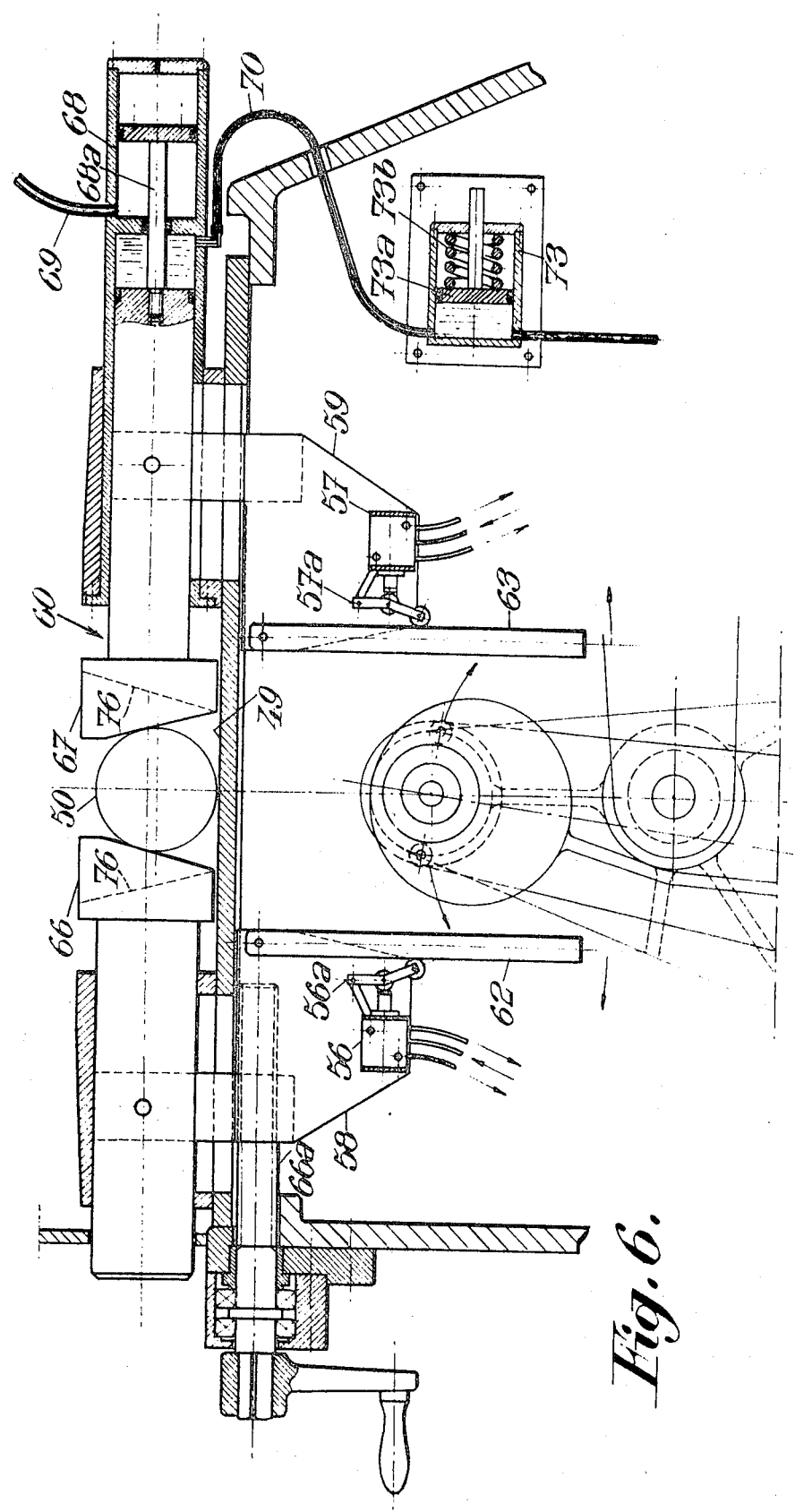
FIG. 6 is a cross sectional view showing various features of a sectioning machine in accordance with the present invention.

As has been mentioned above, the bar 50 to be cut into sections is gripped in a vice 60 (FIGS. 3, 4 and 6). The means for operating this vice may for example be hydraulic. In addition means (described below) may be provided which are activated when the bar 50 is in a predetermined axial position relatively to the wheel 2. This being so, in accordance with a further feature of the invention these means, and the device controlling the hydraulic control unit, may be arranged so that on the one hand the advancing of the tool into the bar 50 can only take place if the vice 60 is clamped firm and the bar is located so that it will cut to the required length, and on the other hand the vice need not be unclamped where, after a cutting action has been interrupted and the sectioning machine arrested, for example for the replacement or sharpening of the tool, if one wishes to continue this cutting.

For this purpose use is made of a length-determining abutment for the bar 50, as illustrated in FIG. 4, this being diagrammatically shown as a contact 64 and this being disposed on table 49. This contact 64 is normally open and when the bar 50 engages it, it closes. The abutment is adjustable on table 49 so as to set it to the length which is to be cut from the bar, this length being defined by the distance between the abutment and the right hand side of the grinding wheel (see FIG. 4).

In the embodiment illustrated, the clamping is performed by the vice 60 one jaw 66 of which may be mechanically movable by a screw 66a, and the other jaw 67 of which is carried by rod 68a of a double-acting piston cylinder unit 68. The two chambers of this unit are respectively supplied through two conduits 69, 70, which represent the two outlets from a hydraulic distributor 71 which has four inlets (two for the pressure liquid and two for exhaust). Each outlet conduit 69, 70 may be connected either to pressure or to exhaust, depending on the adjustment of the distributor 71. The status of the latter is hydraulically determined by two three-way solenoid valves 71a and 71b, the two outlets from which are connected to conduits 26 and 27. As regards the electrical connections (FIG. 5), solenoid valve 71a is in parallel with the solenoid valve 15g and in series with contact 64, and solenoid valve 71b is likewise arranged in parallel with the solenoid valve 15g and in series with the contact 72a, controlled by a relay 72. This relay 72 is connected to the terminals of the solenoid valve 15g and incorporates the contact 21a which closes when jack 18 is empty. Relay 72 is devised and arranged in such a way that contact 72a is only closed fugitively when the relay is energised, that is to say the electromagnet of the solenoid valve 71b only receives an impulse at the precise moment at which the relay 72 is energised.

Arranged in conduit 70 (FIGS. 3 and 6) is a pressure accumulator 73, constituted by a piston cylinder unit of which the piston 73a is biased in the exhaust direction by spring 73b. A pressure responsive switch 74 controls the pressure in the conduit 70, and thus in the unit 68, and in the accumulator 73, and closes a normally-open contact 74a when the pressure in conduit 70 attains or exceeds a predetermined figure representing a suitable gripping by the vice 60. A non-return valve 75 is arranged in the conduit through which distributor 71 is fed with liquid under pressure for conduit 70. Contact 74 is arranged in the electric circuit of the installation in such a way that the cutting proper cannot be performed unless the vice 60 is clamped firm. To this end the contact 74a is disposed in the common part of branches 44a and 44b of relay 44. The operation and use of the means which have just been described are as follows. The operator adjusts the position of jaw 66 by screw 66a in accordance with the dimensions of the bar 50, and in such a way that the latter is approximately centred. He then places the bar 50 against the jaw 66 and moves it axially until it comes into abutment so as to close contact 64 (FIG. 4). If the installation is already electrically live, solenoid valve 71a is energised and operates distributor 71 to supply jack 68 and accumulator 73 if pressure has already been built up in conduit 26. If this pressure has not already been generated or if the installation is still not electrically energised, distributor 71 will be operated with a delay dependent on the setting of the timing device 38 and on the moment at which the installation is energised. It is to be noted that, as soon as the installation is electrically live, relay 72 is energised because contact 21a is closed (jack 18 being emptied). The fugitive contact 72a closes momentarily and allows an impulse to pass to the solenoid valve 71b. This impulse, which is simultaneous with the energising of the installation, has no effect on the distributor 71 (which is hydraulically controlled) because the hydraulic group 22 does not function again (due to the timing device 38).

Thus, as soon as, or shortly after, the installation is energised and the bar 50 is in place against its abutment 64, liquid is admitted under pressure into the unit 68 so as to fill it and thus close the vice 60. Once this unit is full, it is the accumulator 73 which fills (against the action of spring 73b) and the pressure increases in conduit 70. When the pressure reaches the feed pressure at which the jack 73 is in a state of equilibrium, it operates the pressure switch 74 which closes contact 74a. The approach of the grinding wheel takes place during this period. When it is completed, switch 41 moves into position b and, if the switch 43 is closed, relay 44 is energised through its control connection 44a (contact 21b being closed because jack 18 is again empty, and contact 74a is closed because the vice is locked). The cutting operation itself then takes place as described above.

When this cutting is stopped either by the pressure switch 16h, or by the manual switch 43, the installation remains under tension and under pressure, the grinding wheel disengages under the action of the counterweight and, when unit 18 is empty, the relay 72 sends an impulse to the solenoid valve 71a which, having regard to the fact that the group 22 is functioning, causes the distributor 71 to rock and open the vice 60.

On the contrary if it is required to arrest the cutting, for example to change the wheel, but desired to continue this cut the next time, it is then only required to open the main switch 32 or the press button contact 36 so as to interrupt the hydraulic and electrical feeds without changing the condition of distributor 71. These feeds are also interrupted when the piece 121 abuts against cap 13, which operates the manometer 18h, upon contacts 18i and 18j. All the solenoid valves are de-energised and jacks 15 and 18 empty. The non-return valve 75 fulfilling its function, however, conduit 70 is not connected to exhaust. Accumulator 73 maintains the pressure in unit 68 and might even compensate any losses from the same. Thus it is possible to stop the sectioning machine completely whilst maintaining the vice closed and the bar 50 consequently in position.

When, for example after the grinding wheel has been changed, pressure is applied to the push button 35, solenoid valve 71b receives an impulse but operates idly because pressure has not been re-established in conduit 26 (thanks to the timing device 38). As soon as this pressure is restored, accumulator 73 is "recharged" afresh if necessary, thanks to the solenoid valve 71a, the pressure switch 74 is operated, insofar as it has not ceased so to be, and the cutting may be recommenced as previously described.

The front face of at least one of the jaws or, as seen in FIGS. 3 to 6, the front face of the two jaws 66, 67 is inclined downwardly to compensate for the penetration force of the grinding wheel, and these jaws may overlap, by virtue of notches 76 for clamping bars of small diameter or size.

In certain instances, and particularly for the cutting of very hard material, it is necessary to operate with a substantially constant and well defined cutting speed so as to avoid too rapid wear of the wheel. This cutting speed is represented by the circumferential speed of the wheel. Consequently, it is necessary to adjust this speed to the required value from time to time as the wheel wears. In accordance with a further characteristic of the invention, in the case of a sectioning machine which comprises means for regulating the rate of rotation of the wheel, these regulating means may be controlled by a member which is responsive to at least a part of the relative displacement of the piston 15b and of the sleeve 15a of the approach jack, such that the rate of rotation of the wheel 2 varies in the same sense as the amount of displacement of piston 15b relatively to sleeve 15a.

The preferred embodiment of this feature is illustrated in FIG. 2.

Mounted on the piston 15b of jack 15 is a sort of stepped half-tubular sleeve 77 forming a cam. The surface of the cam operates contact 78 which varies connections to the poles of motor 4 which is a multi-speed motor.

When the sectioning machine is started up the motor turns the wheel 2 at a bottom speed. This speed is increased by stages when the jack 15 fills (approach movement of the wheel) and as the cam 77 itself, first of all through one shoulder, or successively through its shoulders operates contact 78.

It is to be noted that the regulation of the speed of the rate of rotation of the grinding wheel is performed solely during the approach phase, that is to say when the wheel has not yet engaged the work, and when this speed is then automatically adjusted, between two cuts, to the optimum moment. Thus, after one cutting operation, the grinding wheel returns to its end of approach stroke position (for the next cut) in which its circumference is at a predetermined distance from bar 50. Consequently, if the wheel is worn, the shaft of the wheel, for this position of the circumference, is closer to the bar 50 than was previously the case and the jack 15 is filled a little more, which further actuates contact 78 and increases the speed of rotation of the wheel. This increase in angular velocity compensates the reduction in circumferential speed due to the wear of the wheel.

Cam 77 may be devised in a different way. Thus it may be of the bell cam type and operate a contact of that shown at 78 which continually controls the voltage and intensity of the current which is supplied to motor 4 if the latter has a uniformly variable speed.

Cam 77 may be replaced by any appropriate system (preferably mechanical) which transmits the movement of piston 15b, relatively to sleeve 15a, to a receiver member which, at least from a certain position of the piston, controls the rotational speed of the motor. Thus use may be made of a rod system T (FIG. 9) which acts continuously or stagewise, for example on the supply to the motor or on the control of a speed variator so as to obtain, if necessary, a readjustment of the cutting speed from one cut to the next.

This feature of the invention has three advantages in particular:

The regulation of the speed of cutting is not reliant on the more or less accurate reaction of the operator;

The rotation of the wheel is carried out a plurality of times or continuously;

The speed regulating member is foolproof.

FIG. 7 illustrates a sectioning machine with a control device which is based on geometrical principles and represents another embodiment of the invention. In this figure the hydraulic unit 8 is pivoted to the bottom of the frame at 10a. The advancing movement of the balance arm 3a is controlled directly by a pin 9 through an element 9a. Balance arm 3 comprises a slideway 79 movable on a slide 80 which is articulated at one end 81 to the frame. The balancing jack or unit 51 is rigidly connected to the slide 80 and its rod 51a is connected at 54 to the slideway 79. The balancing of wheel 2 is effected by jack 51 which produces a linear alternating movement of the slideway 79 on slide 80.

In this embodiment, as in the case of that in FIG. 1, the direction of displacement of the axis of the grinding wheel is rectilinear having regard, as before, to the mean position occupied by this axis during the balancing movement.

The sectioning machine illustrated in FIG. 8 differs from that of FIG. 1 in the fact that the grinding wheel 2 thereof is not equipped with any balancing feature. The double-acting piston cylinder unit used in the latter for balancing purposes is omitted and replaced by link 82 articulated at 83 to the frame of the machine and at 84 to the arm 3. The pivot point 83 and the length of the link are preferably such that the axis of the grinding wheel 2 moves approximately in a vertical plane.

There are a number of advantages in the forms of the invention which have been described above, notable amongst them being the facts that:

It now becomes unnecessary to measure the diameter of a bar to be cut into sections;

The majority of the adjustments normally required are avoided, for example the regulation of the end of the approach stroke, the amplitude of the balancing movement, and the rate of rotation of the wheel;

The regulation of the depth of cut in the work, which is necessary when there is repetitive cutting, is extremely simple and does not have to be re-set on replacement of worn tool by a fresh one;

The withdrawal stroke of the tool, otherwise than when the machine is completely stopped, is reduced to a strict minimum;

The position of the working edge or circumference of tool at the end of the approach stroke is independent of the diameter of the tool (and consequently of the wear of the latter);

The rate of cutting is a function of the original diameter and of the wear of the tool, but it is adjusted and readjusted automatically;

The machine is adaptable equally well to single cutting operations or series cutting;

The operation is automatic but is very flexible in use;

The tool can be changed without need to unclamp the vice and without the vice becoming unclamped.

It will be understood that the invention is not limited to the specific embodiments thereof which have been described above but comprehends within its scope all modifications thereof.

What we claim is:

1. In a sectioning machine comprising a fixed frame and a work support for a work, a circular cutting tool arranged for movement through an approach stroke, a cutting stroke and a withdrawal stroke relatively to said work, means including a mechanical member for effecting said movement, and means controlling the approach stroke, the cutting stroke and the withdrawal stroke of the cutting tool relatively to the work, the improvement wherein the control means comprises a hydraulic unit including (a) a first control unit comprising piston and cylinder elements and for controlling the cut by said tool, the elements of said first control unit both being movable relatively to said frame, and one of them being rigidly connected to said mechanical member, (b) a second control unit comprising piston and cylinder elements and for regulating the depth of cut into the work, the elements of said second control unit likewise being movable relatively to said frame and one of them being operable, by the element of said first control unit which is rigidly connected to the mechanical member, and through a unilateral abutment, in response to the cutting stroke of the tool into the work, and (c) a third control unit comprising piston and cylinder elements and for controlling the approach stroke of the tool, one element of said third control unit being movable and rigidly connected to the movable elements of said first and second control units other than the said elements of the first and second control units adapted to make a unilateral abutment, and the other element of the third control unit being connected to said frame, and said control means further comprising hydraulic and electrical means to control said hydraulic unit, said hydraulic and electrical means being adapted to operate said third control unit to bring said tool to a predetermined distance from the work, then to operate said first and second control units and move the tool in with a cutting stroke, and finally to operate at least one of said three control units for retraction of the tool.

2. In a sectioning machine according to claim 1, further including means for setting the working edge of said tool relatively to the work, said setting means comprising an emitting member and a receiving member responsive to a transmission medium emitted from said emitting member and capable of being intercepted by said tool, the improvements in which said setting means are in a fixed position relatively to the frame of the machine such that, when the approach stroke of the tool has brought the outline of the same to a predetermined distance from the work, this outline intercepts the transmission medium from the emitting member and the receiving member responds to apply a control to said hydraulic and electrical means and arrest the approach stroke of the tool.

3. In a sectioning machine according to claim 2, further including motor means for applying a balancing movement to the said cutting tool, the improvement wherein the said hydraulic and electrical means are adapted to operate said motor means only after the approach stroke of the tool has been arrested by the control response from said receiving member and the transmission medium has ceased.

4. In a sectioning machine according to claim 1, for cutting work of bar form and further including hydraulic means for clamping bar on said work support, and means for sensing a predetermined axial positioning of the bar relatively to the tool, the improvement wherein said hydraulic and electrical means are arranged to cooperate with said hydraulic clamping means and with said sensing means so as to prohibit a cutting stroke by said tool into the bar unless the latter is in said predetermined axial position and is clamped by said hydraulic clamping means, and to maintain the clamping of the bar by said clamping means when the sectioning machine is stopped.

5. In a sectioning machine according to claim 1, further including a driving motor to rotate said cutting tool and means for regulating the rate of rotation of said motor, the improvement wherein said regulating means are controlled by a member responsive to part at least of the relative displacement between the elements of said third control unit, whereby the rate of rotation of said tool increases in the same sense as the magnitude of said relative displacement.

6. In a sectioning machine according to claim 1, the improvement wherein the hydraulic unit comprises a sleeve housing which is connected at one end to the frame of the machine and accommodates therein the three control units, the cylinder element of the third control unit being held in said housing at the end part thereof connected to the frame of the machine, the piston elements of the three control units being rigidly interconnected by rods engaged between said piston elements along the axis of said housing, and the cylinder element of said first control unit being slidably mounted in said housing and being adapted to drive the cylinder element of said second control unit. said second control unit.

7. In a sectioning machine according to claim 6, the improvement wherein said hydraulic and electrical means are arranged to interrupt the supply of liquid to the third control unit and thereby bring about cessation of the approach movement of said tool at a preset distance from the work, the liquid in said third control unit then forming a liquid stop for the rigidly connected piston elements of the three control units.

8. In a sectioning machine according to claim 6, the improvement wherein said hydraulic and electrical means comprise means responsive to excess liquid pressure in said second control unit to interrupt the supply of liquid to said first control unit, the feed movement of the tool into the work being determined by said hydraulic and electrical means which control the maintenance in said second control unit of a quantity of liquid constituting an abutment for the cylinder of said second control unit.

9. In a sectioning machine according to claim 6, the improvement wherein said hydraulic and electrical means include means responsive to an excess liquid pressure in said first control unit to interrupt the supply of liquid to said first control unit, and wherein the displacement of the cylinder element of said first control unit, corresponding to the cutting feed movement of the tool, is limited.

10. In a sectioning machine according to claim 6, the improvement wherein said hydraulic and electrical means include means responsive to an excess liquid pressure in said first control unit to interrupt the supply of liquid to said first control unit, wherein the displacement of the cylinder element of said first control unit, corresponding to the cutting feed movement of the tool, is limited, wherein the effective surface area of the piston element of said second control unit is substantially smaller than the effective surface area of the piston element of the first control unit, and wherein said hydraulic and electrical means are adapted to produce an exhausting of said second control unit when the piston element of the first control unit impels the cylinder element of the second control unit, the displacement of the cylinder element of said first control unit being limited by an abutment provided on said sleeve housing or by the abutment formed by the piston element of said second control unit for the cylinder element of said second control unit.

11. In a sectioning machine as claimed in claim 6, the improvement wherein the tool is carried by an arm which also mounts a motor driving said tool, said arm is pivotally connected to one end of a lever pivotally mounted on the frame of the machine, the other end of said lever being articulatedly connected to the cylinder element of said first control unit, and wherein said arm is also connected to one end of a rod which, at its other end, is articulatedly connected to the frame of the machine.

12. In a sectioning machine according to claim 6, including motor means for applying a balancing movement to said cutting tool, the improvement wherein the tool is mounted on an arm which also carries a motor for driving said tool, said arm is pivotally connected to one end of a lever which is pivotally mounted on the frame of the machine and is pivotally connected at its other end to the cylinder element of said first control unit, and a rod is pivotally connected to said arm and to said motor whereby the movement of balancing said tool is communicated to said arm by said motor means through the intermediary of said rod.

13. In a sectioning machine according to claim 6, including motor means for applying a balancing movement to said cutting tool, the improvement wherein the tool is mounted on an arm which also carries a motor for driving said tool, and said arm is slidably mounted on a slideway pivotally connected to the frame of the machine and is pivotally coupled to the cylinder element of said first control unit, whereby a balancing movement is communicated to said tool by displacement of said arm relatively to said slideway under the control of said motor means.

14. In a sectioning machine according to claim 6 and including motor means for applying a balancing movement to said cutting tool and including hydraulic work-clamping means comprising a pair of cooperating jaws, the improvement wherein the tool is mounted on an arm which also carries a motor for driving said tool, said arm is pivotally connected to one end of a lever which is pivotally mounted on the frame the machine and is pivotally connected to its other end to the cylinder element of said first control unit, and a rod is pivotally connected to said arm and to said motor whereby the movement of balancing said tool is communicated to said arm by said motor means through the intermediary of said rod, and wherein the said motor means comprise a double-acting piston/cylinder unit connected to said rod and under the control of abutment members rigidly associated with said jaws, said abutment members being adapted to reverse the movement applied by said double-acting unit to said rod each time said arm contacts one or other of said abutment members.

15. In a sectioning machine according to claim 6, including a driving motor to rotate said cutting tool and means for regulating the rate of rotation of said motor, the improvement wherein said regulating means are controlled by a member responsive to part at least of the relative displacement between the piston and cylinder elements of said third control unit, whereby the rate of rotation of said tool increases in the same sense as the magnitude of this relative displacement, and wherein the member responsive to part at least of said relative displacement comprises a rod which is slidably mounted in said sleeve housing and is adapted to slide in a direction perpendicular to the axis of said sleeve housing, said rod bearing at one end against a cam rigidly connected to the piston element of said third control unit.

References Cited

UNITED STATES PATENTS

| | | | |
|---|---|---|---|
| 2,262,049 | 11/1941 | Robinson | 51—98X |
| 2,354,509 | 7/1944 | Dreher | 51—98 |
| 2,511,563 | 6/1950 | Bullard | 51—98 |
| 2,693,057 | 11/1954 | Eastwood | 51—98 |
| 2,836,015 | 5/1958 | Stone | 51—98 |

LESTER M. SWINGLE, Primary Examiner

U.S. Cl. X.R.

51—165.9